(12) United States Patent
Manoochehri et al.

(10) Patent No.: US 10,963,424 B2
(45) Date of Patent: *Mar. 30, 2021

(54) AGGREGATING, DISTILLING, AND ANALYZING LARGE-SCALE DATA SETS

(71) Applicant: SWITCHBOARD SOFTWARE, INC., San Francisco, CA (US)

(72) Inventors: Michael Manoochehri, Oakland, CA (US); Ju-Kay Kwek, San Francisco, CA (US)

(73) Assignee: SWITCHBOARD SOFTWARE, INC., San Francisco, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 16/241,844

(22) Filed: Jan. 7, 2019

(65) Prior Publication Data

US 2019/0384744 A1   Dec. 19, 2019

Related U.S. Application Data

(63) Continuation of application No. 14/818,200, filed on Aug. 4, 2015, now Pat. No. 10,176,181.

(60) Provisional application No. 62/046,754, filed on Sep. 5, 2014, provisional application No. 62/033,072, filed on Aug. 4, 2014.

(51) Int. Cl.
| | |
|---|---|
| G06F 16/13 | (2019.01) |
| G06F 16/11 | (2019.01) |
| G06F 16/182 | (2019.01) |
| G06F 16/25 | (2019.01) |
| G06F 16/17 | (2019.01) |
| G06F 16/14 | (2019.01) |

(52) U.S. Cl.
CPC ............ *G06F 16/13* (2019.01); *G06F 16/116* (2019.01); *G06F 16/14* (2019.01); *G06F 16/17* (2019.01); *G06F 16/183* (2019.01); *G06F 16/254* (2019.01)

(58) Field of Classification Search
CPC .................................................... G06F 9/5072
See application file for complete search history.

(56) References Cited

U.S. PATENT DOCUMENTS

| | | |
|---|---|---|
| 2003/0236784 A1 | 12/2003 | Tang et al. |
| 2010/0121847 A1 | 5/2010 | Olston et al. |
| 2014/0047342 A1 | 2/2014 | Breternitz et al. |
| 2014/0068550 A1 | 3/2014 | Simitsis et al. |
| 2014/0279257 A1 | 9/2014 | Fine et al. |
| 2015/0264122 A1 | 9/2015 | Shau et al. |
| 2015/0347101 A1 | 12/2015 | Boehm et al. |

OTHER PUBLICATIONS

Schonherr, S., et al., Cloudgene: A graphical execution platform for MapReduce programs on private and public clouds. BMC bioinformatics, 13(1), 200 (2012).

*Primary Examiner* — William Spieler
(74) *Attorney, Agent, or Firm* — Perkins Coie LLP

(57) ABSTRACT

Systems and methods for aggregating, distilling, and analyzing large scale data sets are disclosed. In some embodiments a task object is generated based on inputs received via a user interface defining actions to perform on one or more data sets. In some embodiments, the task object is forwarded to a pipeline processor configured to invoke a distributed computing cluster to process the data sets according to the defined actions.

20 Claims, 14 Drawing Sheets

| | | | | | | David Newton |
|---|---|---|---|---|---|---|
| 24 hrs Time monitored | 24.63 GB Total data processed | 12.34 B Total rows processed | | 5 Active pipelines | | 2 Errors |

Monitoring

Tables

Recent activity

| | | Search... | | Filter ▼ | | + New Table | Action ▼ |
|---|---|---|---|---|---|---|---|
| ☐ | Table Name | | Rows | Columns | Last Update | | Pipeline Status |
| ☐ | CDS global transactions ★ ⊞ JOIN | | 206.5 M | 57 | 05/01/2014 11:35 am | | Processing |
| ☐ | CDS demo data - full year ★ ⊞ TABLE | | 206.5 M | 57 | 05/01/2014 11:35 am | | Up-to-date |
| ☐ | CDS EMEA 2014 year-to-date ★ ⊞ ROLLUP | | 206.5 M | 57 | 05/01/2014 11:35 am | | Up-to-date |
| ☐ | Product Catalog Update ★ ⊞ TABLE | | 206.5 M | 57 | 05/01/2014 11:35 am | | Up-to-date |
| ☐ | Outreach campaign activity v3 ★ ⊞ TABLE | | 206.5 M | 57 | 05/01/2014 11:35 am | | Up-to-date |
| ☐ | Customer ACME location ★ ⊞ TABLE | | 206.5 M | 57 | 05/01/2014 11:35 am | | Import error ⚠ |

*FIG. 5B*

AGGREGATING, DISTILLING, AND ANALYZING LARGE-SCALE DATA SETS

CROSS-REFERENCE TO RELATED APPLICATION(S)

This application is a continuation of U.S. patent application Ser. No. 14/818,200, titled, "AGGREGATING, DISTILLING, AND ANALYZING LARGE-SCALE DATA SETS, filed Aug. 4, 2015, now U.S. Pat. No. 10,176,181, issued Jan. 8, 2019, which claims the benefit of and/or the right of priority to U.S. Provisional Application No. 62/033,072, titled, "METHODS AND SYSTEMS FOR AGGREGATING, DISTILLING, AND ANALYZING MULTIPLE LARGE-SCALE DATA SETS", filed Aug. 4, 2014, and U.S. Provisional Application No. 62/046,754, titled, "METHODS AND SYSTEMS FOR AGGREGATING, DISTILLING, AND ANALYZING MULTIPLE LARGE-SCALE DATA SETS", filed Sep. 5, 2014, all of which are hereby incorporated by reference in their entirety for all purposes. This application is therefore entitled to a priority date of Aug. 4, 2014.

TECHNICAL FIELD

The present disclosure relates to systems and methods for aggregating, distilling and analyzing large-scale data sets, in some embodiments for business intelligence applications.

BACKGROUND

Companies are increasingly struggling to operationalize the vast amount of data they generate and retain. Such data may provide invaluable insight into business operations and customer behavior, however the process of operationalizing the data quickly hits a bottleneck for many companies (particularly companies not focused on information technology) in that collection, storage, and preparation of the large amounts of data is highly technical, typically requiring the skills the company's IT professionals. Assuming a company's IT staff has the capacity to assist in operationalizing the company's data, the process may still typically take many weeks to perform, thereby jeopardizing the company's ability to quickly act on the business intelligence gained through the data.

To facilitate the analysis of large sets of data, systems and methods are disclosed herein that may provide a "turnkey" solution for enterprises and organizations seeking to manage and make use of the large amount of data they generate.

BRIEF DESCRIPTION OF THE DRAWINGS

The present embodiments are illustrated by way of example and are not intended to be limited by the figures of the accompanying drawings. In the drawings:

FIGS. 5A-5C illustrate a series of example graphical interfaces through which a user may access the functionalities of a system according to the present teachings via a device.

DETAILED DESCRIPTION

Overview

From the foregoing, it will be appreciated that specific embodiments of the invention have been described herein for purposes of illustration, but that various modifications may be made without deviating from the scope of the invention. Accordingly, the invention is not limited except as by the appended claims.

As will be described in more detail herein, the present disclosure teaches systems and methods that may allow individuals, enterprises and other organizations to aggregate, distill, and analyze multiple large-scale data sets through, for example, use of cloud-based automated data operations as a service. In accordance with some of the teachings, business users may define, manage, and monitor their data processes, for example via visual interface presented at a computing device. Their data may then be aggregated and distilled through a cloud-based processing pipeline and then export to a cloud-based large-scale data analysis platform through which the distilled data may be efficiently analyzed.

An Example System

Figure 1:
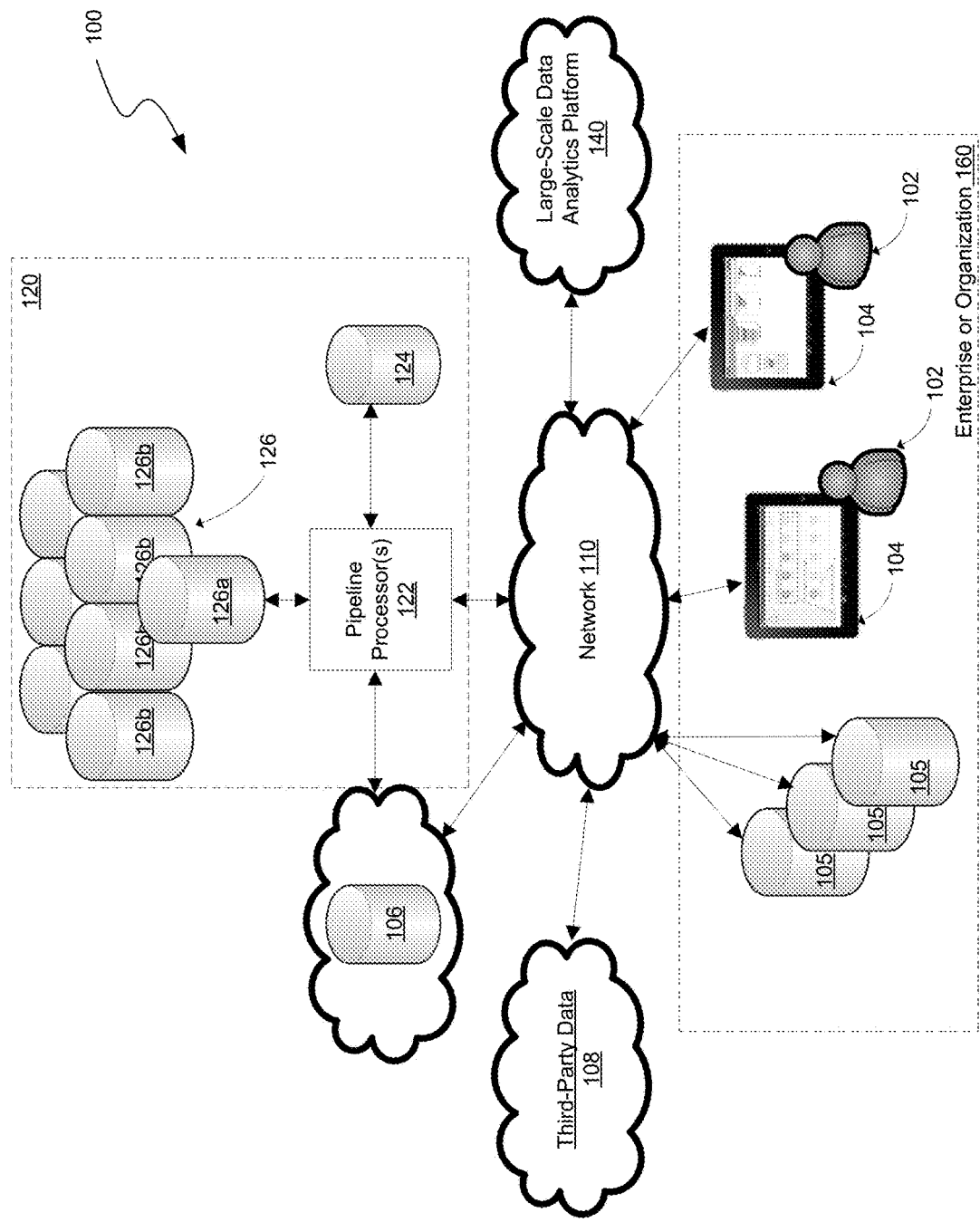
FIG. 1 is a high-level diagram illustrating an example system for aggregating, distilling, and analyzing multiple large-scale data sets, according to some embodiments.

FIG. 1 is a high-level diagram illustrating an example system 100 for aggregating, distilling, and analyzing multiple large-scale data sets, according to some embodiments of the present teachings. As shown in FIG. 1, an enterprise setting or other organization 160 may include one or more premises data sources 105 storing data related to the organization 160. For example, the organization 160 may be a retailer with many terabytes of point-of-sale data stored on premises data sources 105. Premises data sources 105 may include, but are not limited to data stored in raw form or in one or more databases, data stores, data warehouses, or any other data structure types. Organization 160 may also include users 102 using client devices 104. For example, according to some embodiments, users 102 may be business analysts for a retailer organization 160. Generally, users 102 may, via client devices 104, utilize a system 100 to aggregate large-scale data sets from multiple sources, including premises data sources 105 as well as third-party data sources 108. For example, third-party data sources 108 may include, but are not limited to, online advertising click data or web analytics data such as provided via services like Google Analytics. Similarly, third-party data sources 108 may include, but are not limited to data stored in raw form or in one or more databases, data stores, data warehouses, or any other data repositories.

Client devices 104 may be any system and/or device, and/or any combination of devices/systems that is able to establish a communication or a connection, including wired, wireless, cellular connections with another device, a server and/or other systems such as platforms 120 and 140. Client devices 104 typically include a display and/or other output functionalities to present information and data exchanged between among the devices 104, platform 120 and platform 140. It shall be understood that client devices 104 may comprise any combination of computing hardware and software, for example including hardware components as described with reference to FIG. 6.

Client devices 104 may include portable devices or non-portable computing devices. For illustrative purposes, client devices 104 may be any of, but not limited to, a server desktop, a desktop computer, a computer cluster, a notebook, a laptop computer, a handheld computer, a palmtop computer, a mobile phone, a cell phone, a PDA, a smart phone (e.g., iPhone™, etc.), a tablet (e.g., iPad™, etc.), a phablet (e.g., HTC Droid DNA™, etc.), a tablet PC, a thin-client, a hand held console, a smart watch (e.g., Apple Watch™, etc.), a smart glass device (e.g., Google Glass™, etc.) or any other computing device running on any platform or any operating system (e.g., Apple™ OS X, Apple™ iOS, Windows Mobile™, Android™, Blackberry™ OS, Embedded Linux™ platforms, Palm™ OS, Symbian™ platform, Google Chrome™ OS, etc.).

The input mechanism on client devices 104 may include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Data from sources 105 and 108 may be collected and stored on one or more storage devices at an intermediate staging area, for example at a storage platform 106. According to some embodiments, storage platform 106 may include a plurality of physical computing and storage devices functioning in a distributed manner offering virtualized off-premises data storage. According to some embodiments, storage platform 106 may be provided as a cloud storage service by a third-party hosting company. For example, Amazon Web Services™ offers a simple remote cloud storage service called Amazon S3™. According to some embodiments, storage platform 106 may be part of an aggregation and distillation platform 120 (described in more detail herein). While a storage platform 106 representing an off-premises staging area for data collected form sources 105 and 108 may represent an efficient architecture for managing the collection of large raw data sets for later aggregation and distillation, a person having ordinary skill in the art will recognize that storage platform 106 may not be necessary in some embodiments. For example, data from sources 105 and 108 may be pulled or pushed directly into a processing pipeline as needed and as described herein with reference to FIG. 2, without the need for staging at a storage platform 106.

System 100 may include a platform 120 for aggregating and/or distilling large-scale data sets, for example, data stored at data sources 150, 108 and/or at storage platform 106. Platform 120 conceptually describes the logical combination of hardware and/or software that provides a data processing pipeline as a service to users, in accordance with the present teachings. Platform 120 may include one or more pipeline processors 122, one or more application databases 124 and one or more distributed computing clusters 126 including one or more cluster controllers 126a controlling one or more cluster nodes 126b.

According to some embodiments cluster 126 may comprise a distributed file system architecture such as the Hadoop Distributed File System (HDFS). HDFS is a distributed, file-system for the Apache Hadoop™ framework that has the capability of storing large-scale data sets across multiple machines. HDFS achieves reliability by replicating the data across multiple host data nodes. Data nodes can talk to each other to rebalance data, to move copies around, and to keep the replication of data high. Data stored in an HDFS may be accessed via an application programming interface (API) (e.g., the Java™ API).

Platform 120 may include one or more job engines to process data via the distributed file system of cluster 126. Job engines may be associated with cluster 126 and pipeline processor(s) 122. For example, cluster 126 may be associated with a MapReduce™ engine to which client applications (e.g., application 240 referenced in FIG. 2) may submit MapReduce™ jobs as part of a task to be performed at the cluster 126. MapReduce™ generally describes a programming model for processing large-scale data sets across multiple computing nodes (e.g., nodes 126b) that comprises two steps: a map step and a reduce step. At the map step, a cluster controller (e.g., cluster controller 126a) may intake a problem or query associated with a large-scale data set and divides the problem or query amongst the multiple computing nodes of the cluster (e.g., nodes 126b). The multiple computing nodes may process the data and return the answer to the cluster controller. At the reduce step the cluster controller may collect the answers from the multiple nodes and combine into a single output.

System 100 may also include a large-scale data analytics platform 140 through which data aggregated and/or distilled via platform 120 may be analyzed. According to some embodiments, analytics platform 140 may include cloud storage and one or more query/analytics engines (not shown). According to some embodiments, access to analytics platform 140 may be provided by a third party as a service. For example, Google™ offers large-scale data analytics via Google BigQuery™. Using BigQuery™ in conjunction with Google cloud storage services, users can analyze large-scale data sets through queries, for example SQL queries. Data to be analyzed using Google BigQuery™ is typically imported and stored on Google's cloud storage system as a comma-separated values (CSV) file or JSON object. Another example of a third-party analytics platform is Amazon Redshift. According to some embodiments, a user 102 may analyze large-scale data-sets using a analytics platform 140 via a device 104. For example, a user 102 may use a visual business intelligence and analytics software (e.g., Tableau™) instantiated on a client device 104 to analyze and visualize large-scale data sets via an analytics platform (e.g., BigQuery™, Amazon RedShift™). It shall also be understood that, in some embodiments, data analytics platform 140 and associated storage may be part of platform 120. In other words, according to such an embodiment, data aggregated and/or distilled at platform 120 may be analyzed by a user 102 using a device 104 without the need for a separate third-party analytics platform (e.g., Google BigQuery™).

As previously noted, FIG. 1 provides a conceptual diagram of platform 120, and it shall be understood that platform 120 may be composed of any combination of computing hardware and software, for example including hardware components as described with reference to FIG. 6. Further, it shall be understood that platform 120 may include components hosted at a single physical location or may include components distributed at multiple physical locations in communication with each other via, for example, network 110. It shall also be understood that platform 120 may include fewer or more components than as shown in FIG. 1. For example, FIG. 1 illustrates an embodiment of the present disclosure in which cloud storage services and business analytics are provided by third-party systems (see cloud storage 106 and analytics platform 140). As previously discussed, the functionality provided by such services may be included as part of platform 120 and offered as a service or suite or suite of services by a platform provider. Users 102 may access the functionality of platform 120 via network 110 a number of ways, including, but not limited to via client software instantiated on a client device 104, or via a web browser instantiated on client device 104. In either case, access to the functionality of platform 120 may be provided via a graphical interface presented to users 102 at client device 104.

All of the aforementioned computing devices, including client devices 104 and any computing devices associated with platform 120, analytics platform 140, cloud storage 106, third-party data sources 108, and premises data source 105, may be connected to each other through one or more wired and/or wireless networks, for example network 110. In general, network 110 may include any collection of distinct data networks operating wholly or partially in conjunction to provide connectivity for the computing devices associated with the system components shown in FIG. 1. Distinct network types, may include, but are not limited to, one or more of, a Local Area Network (LAN), a Wide area network (WAN), a Personal area network (PAN), a Campus area network (CAN), a Metropolitan area network (MAN). Further, connectivity may be achieved wirelessly over any wireless network type, including but not limited to, one or more of, a Wireless Local Area Network (WLAN), or Wireless wide area network (WWAN). Communication over any of the previously listed network types may be enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, and messaging protocols such as, TCP/IP, SMS, MMS, extensible messaging and presence protocol (XMPP), real time messaging protocol (RTMP), instant messaging and presence protocol (IMPP), instant messaging, USSD, and IRC.

In some embodiments, communications can be secured using a secure communications protocol, such as secure sockets layer (SSL), or transport layer security (TLS).

Example System Architecture and Process Flow

Figure 2:
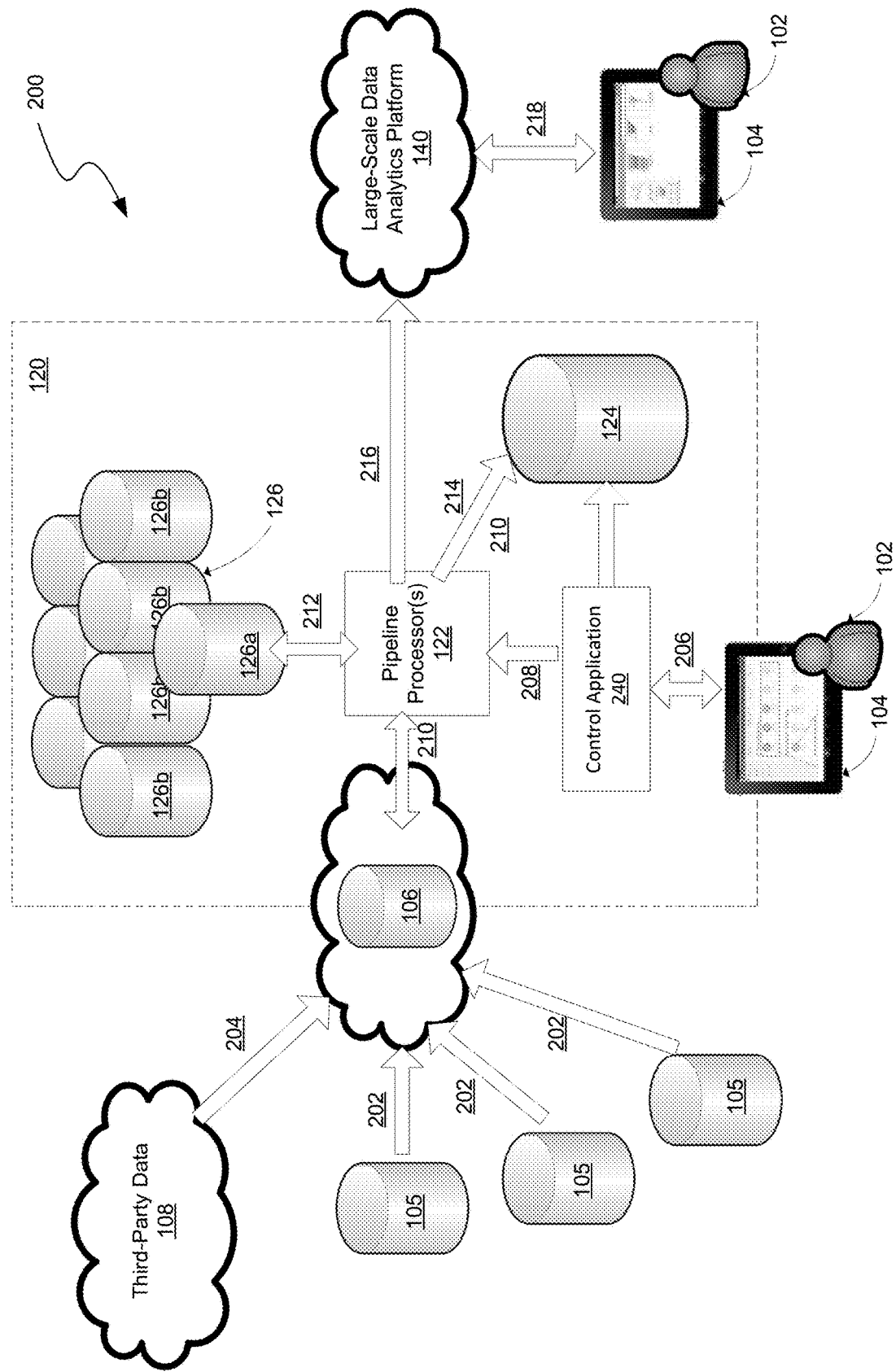
FIG. 2 is a high-level diagram illustrating an example architecture and process flow for aggregating, distilling, and analyzing multiple large-scale data sets, according to some embodiments.

FIG. 2 is a high-level diagram illustrating an example architecture 200 and process flow for aggregating, distilling, and analyzing multiple large-scale data sets. The architecture 200 and process flow may involve components of system 100 as referenced in FIG. 1.

As shown in FIG. 2 at steps 202 and 204, multiple large-scale data sets may be collected and stored, for example at a storage platform 106 for staging. As described with reference to FIG. 1, according to some embodiments, data may be pushed or pulled from premises data sources 105 (see step 202) and/or third-party data sources 108 (see step 204). For example, a retailer organization 160 may house terabytes of point-of-sale data at premises data sources 105, and generate third-party data such as online advertising click data and/or web analytics data (e.g., as provided via services like Google Analytics™) which is stored by a third-party at a source 108. According to some embodiments, premises data sources 105 may include loader agents that automatically push data to be aggregated, e.g., to cloud storage platform 106. Similarly, routines may be programmed to automatically pull third-party data from third-party data sources 108 to be collected and stored, e.g., at storage platform 106.

It shall be understood that the storage of data in the cloud at a staging area (e.g., through a cloud storage provider such as Amazon Web Services™) may represent a secure, efficient, and scalable solution for organizations ill-equipped to handle storage and management of data on a large scale. However, storage in the cloud may not be necessary in all embodiments. For example, an embodiment may be contemplated in which an organization pulls data from its various premises data sources 105 and from third-party sources and stores the data for staging at an organizationally-managed premises data storage (not shown) instead of at a storage platform 106.

Further according to some embodiments, data from sources 105 and/or 108 may be collected and aggregated at platform 120 without staging at a storage platform 106 or organizationally-managed premises data storage. In such an embodiment, credentials may be provided by an organization 160 to a platform 120 provider allowing the data from sources 105 and/or 108 to be directly pulled for aggregation at the platform 120 as needed. In such embodiments, data may be pulled continuously, when certain threshold conditions are met, at regularly scheduled intervals, and/or on demand in response to user command.

At step 206, a user 102 may, via client device 104, initiate an action to be performed on one or more data sets (e.g., the data stored at data sources 105, 108, or storage platform 106 in FIGS. 1-2). As mentioned earlier with reference to FIG. 1, a user 102 in this case may be a business analyst associated with an organization 106. Such a user 102 may wish to ingest the collected data (or a subset of the data) stored at storage platform 106 and process (e.g., via pipeline processor(s) 122) the data in order to distill the data to a more manageable state for later analysis (e.g., via a large-scale data analytics platform 140).

Available actions may include different methods of transformations such as, filtering, sampling, profiling, normalizing, modifying, interpolating, inserting, merging, concatenating, appending or any other methods of data manipulation intended to transform data from one state to another.

In some embodiments, available actions include filtering or cleaning of the data. For example, in many cases data sets may contain a number of errors or outlier data points, requiring filtering or cleaning of the data. Errors or outliers may exist for a number of reasons, including human error in entering the data or later corruption of the data due to storage or transmission errors. In such situations it may be beneficial to clean a data set prior to analyzing so that errant data points do not impact the analysis. Using statistical algorithms, a process may comb a data set searching for and deleting statistical outliers, for example by calculating the mean and standard deviations of a set of values in a given data set and deleting values outside a threshold number of standard deviations. Alternatively, a process may identify and discard of entire blocks of data that may exhibit a standard deviation above a certain threshold. The specific criteria used for filtering or cleaning the data may heavily depend on the type of data involved and the context in which it is gathered and to be analyzed.

According to some embodiments, available actions include normalizing or standardizing the data. Data may often be collected and stored in different formats, organization structures, etc. Returning to the example of the retailer as an organization 160, it may be expected that point of sale data may be collected differently according to different systems utilized to conduct the transactions. For example, while two point of sale systems may both collect and store POS data as database tables they may organize the columns of the related values in a given row differently. Utilization of the two differently organized tables may therefore require normalization of the database tables. According to some embodiments, normalization may include identifying value dependencies, value attributes, candidate keys, etc, and utilizing this information to convert disparate database tables into a normalized form. According to some embodiments outside of the context of database tables, normalization or standardization may also describe processes including the conversion of record file types to a common file type.

According to some embodiments, available actions include profiling or sampling of data sets to extract representative information without the need for the entire data set. In the case of large-scale data sets (i.e., on the order of multiple terabytes of tabular information), analysis may be more efficiently performed by extracting a smaller representative sample in which to analyze. For example, consider again the retailer organization previously discussed. A large multinational retailer may collect multiple gigabytes of point of sale data daily. The amount of data collected over the course of a week, month or year, may therefore potentially reach multiple terabytes. In order to more efficiently analyze this data, a process may be applied to profile and sample the data. For example, based on statistical analysis, a predetermined percentage of data points from each day from each point of sale may be extracted and made into to a representative sample data set. Alternatively, a process may comb the available data sets for sets or subsets of data that fit a particular profile recognized as useful for further analysis.

According to some embodiments, the process of sampling a large-scale data set may include searching for statistical outliers, determining that the outliers are material in representing the characteristics of the overall data set and assigning greater weight to those outlier data points in composing the sample data set. For example, consider a hypothetical data set containing 100 data points. A sampling process may pull from those 100 data points 20 representative data points. In order to do so, the sampling process may identify 10 statistical outliers among the 100 data points, of which 5 are determined to be material and 5 determined to immaterial. Recognizing that the material outliers are important to characterizing the overall data set, a sampling process may assign greater weight to those 5 data points in composing the sample data set. According to a simplified embodiment, a sampling process may require an equal percentage of material outliers in the sample set as in the overall set. In other words, in this example, a sampling process may pull 2 of the 5 identified material outliers for inclusion with 18 data points within the threshold number of standard deviations to form the representative data set of 20 data points. The above example provides a simplified non-limiting scenario in order to illustrate the concept. A person having ordinary skill will understand that differing algorithms may be utilized to define the way in which large scale data sets are sampled. Further, algorithms utilized may depend on a number of factors, including but not limited to, the type of data, intended use, platform architecture, etc.

As mentioned earlier, a user 102 may use a client device 104 to initiate an action on the aggregated data by providing an input indicating the action or set of actions to be performed. According to some embodiments, inputs may be provided by a user 102 via a graphical interface of a device 104. As mentioned earlier, a user 102 may be a business analyst and not an information technology or information systems specialist and so tools to select actions to be performed on the data may be presented in a simple clean graphical manner without the need for the advanced knowledge or expertise of an IT professional. For example, FIGS. 5A-5C illustrate a series of example interfaces 500a-500c through which a user 102 may access the functionalities of a system according to the present teachings via a device 104.

Figure 5A:
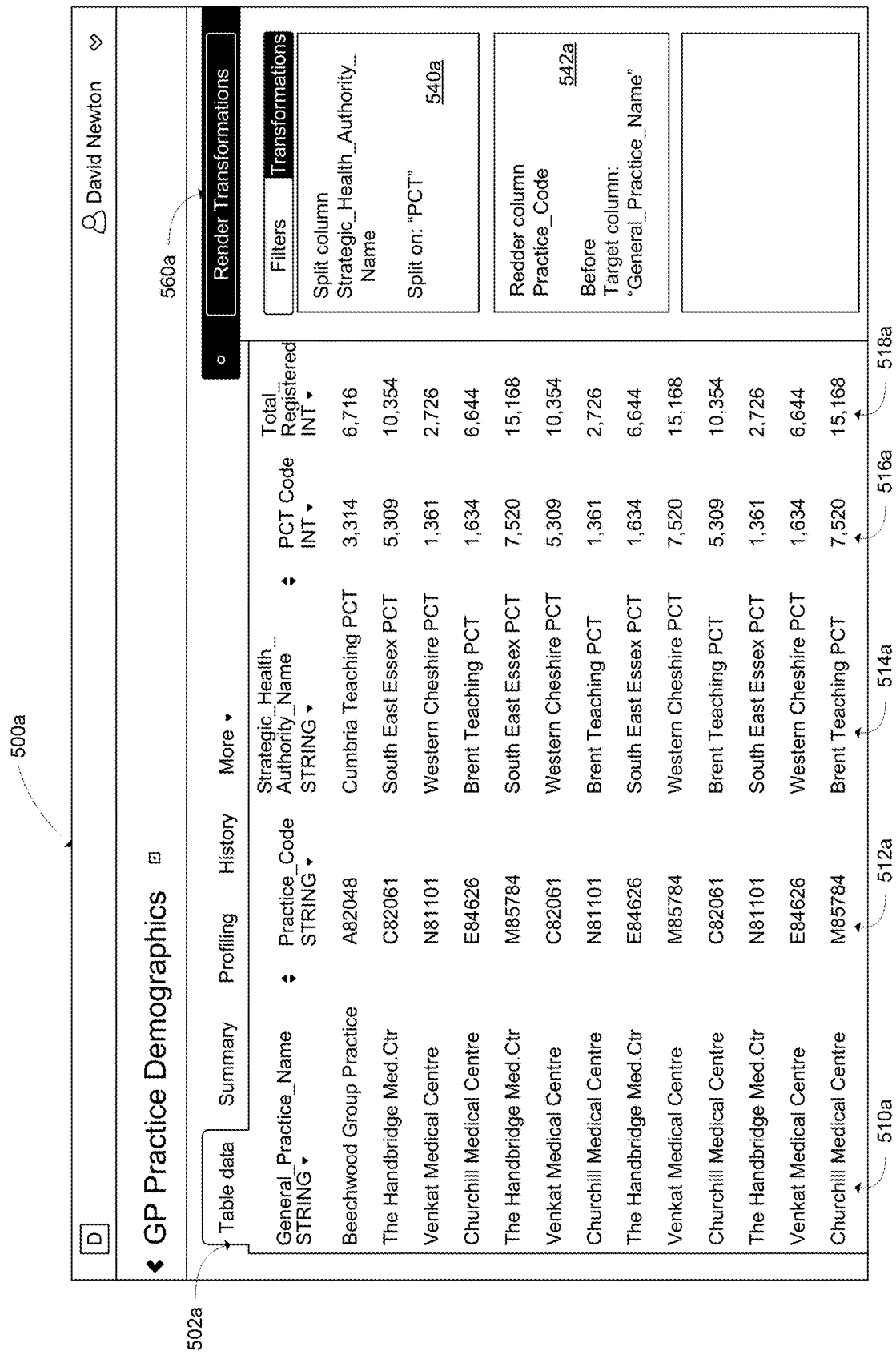
Figure 5C:
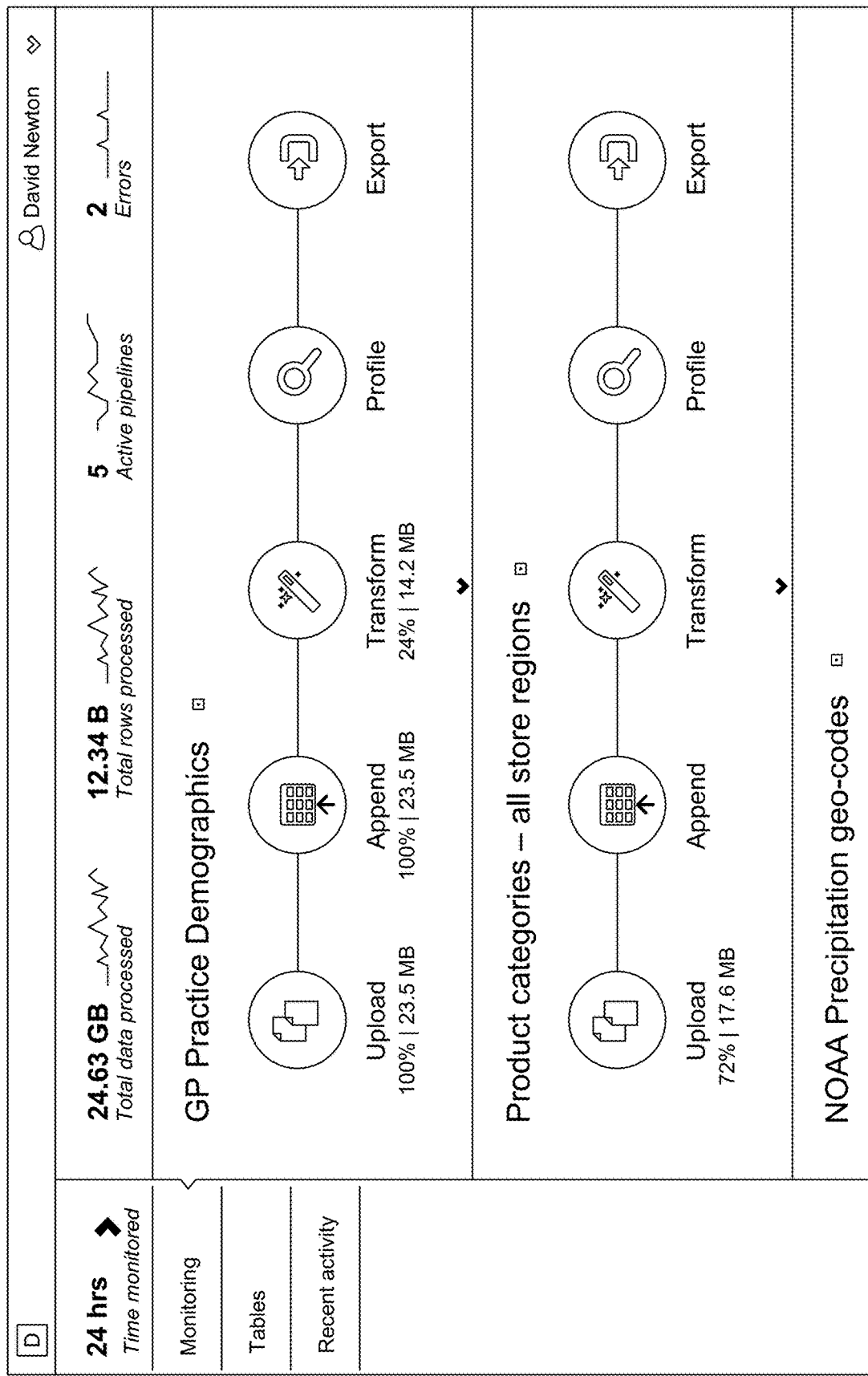

According to some embodiments, an interface 500a (as shown in FIG. 5A) may display a data set available to user 102 for processing. The user 102 may be presented with options to apply various actions (e.g., such as those described above) to the data set. Once a user has selected one or more actions to apply to the data, a task based on the selected actions may be created and fed into a pipeline for processing (this process is described in more detail below). Consider interface 500a as shown in FIG. 5A. Here, a set of data titled "GP Practice Demographics" may be a table 502a comprising columns 510a-518a of n rows of data values (e.g., in the form of strings such as in column 510a, or integers such as in column 516a). According to some embodiments, table 502a may comprise the raw data collected from sources 105 and/or 108 (as shown in FIG. 1). However according to other embodiments, table 502a may comprise a pre-processed representative sample of the complete raw data set, for example sampled as described in previous paragraphs. Interface 500a may also display to user 102 available transformations 540a and 542a. For example, transformation 540a, as shown in FIG. 5A, defines a "split column" transformation defined by the user 102 to split column 514a of table 502a at "PCT." In other words, split column 514a into two columns such that one includes the string, "PCT." User 102, may define transformations (e.g., transformation 540a) in a number of ways via interface 500a. For example, user 102 may drag and drop a column over a transformation (or vice versa). Alternatively, user 102 may type text identifying the column into an editable field in a transformation template. Alternatively, a transformation template may include one or more pull down menus configured to allow user to select transformable data and one or more preset transformations.

It may be further contemplated that users may be able to save present transformations in order to apply to the same or different data sets in the future. For example, if a user 102 consistently applies the same (or similar) series of transformations to their raw data, they may via a graphical interface (e.g., interface 500a) create template transformation definitions that may be reused to define transformation actions for various data sets. In applying the template transformation definition to a new data set, a user 102 may, for example, be prompted to select the data points in the data set at which to apply the transformation (e.g., similar to the "split on 'PCT'" instruction in transformation 540a or the "before target column" instruction in transformation 542a). According to some embodiments, preset transformation templates may include a plurality of transformations. For example, a preset transformation template may include both a "split column" transformation similar to transformation 540a and a "reorder column" transformation similar to transformation 542a.

According to some embodiments, preset transformation templates may be downloaded from others via a network. For example, another user may graphically create a transformation template (e.g., via a graphical interface similar to interface 500*a*) and wish to share the transformation template with other users so that the other users may apply the transformations to their data by simply adding definitions to the template. The other users may be other business analysts within the same enterprise organization 160, or may not be associated at all. In such an embodiment, the other user would be able to apply the transformations to their own data sets by accessing the functionality of platform 120 via a device 104. Further, it is contemplated that a platform 120 may include an online marketplace as a service through which users 102 may purchase and/or share transformation templates.

As shown in FIG. 5B, a user 102 may be presented with list of tasks that they have initiated, each task containing information related to the database table being processed as well as a status of that task within the processing pipeline. As shown in FIG. 5C, a user 102 may also be presented with "operations center" style monitoring of selected data for global activity as well as alerting when attention is required. For example, FIG. 5C shows an example interface displaying information on two separate pipeline projects at various stages of completion. The "GP Practice Demographics" project is displayed as currently transforming while another pipeline project is currently displayed as at the upload or ingest stage. FIGS. 5A-5C illustrate example, interfaces according to some embodiments. It shall therefore be understood that the interfaces may be configured differently, including additional elements or omitting certain elements, without deviating from the present teachings.

Returning to FIG. 2, an interface (such as the interfaces 500*a*-500*c*) may be presented at a device 104 via locally instantiated client software (e.g., control application 240) or may be displayed via a web browser portal accessing software (e.g., control application 240) instantiated at a remote platform (e.g., platform 120). According to some embodiments access to the software (e.g., control application 240) and the associated functionality the platform (e.g., platform 120) may be provided via an application programming interface (API).

At step 206, according to some embodiments, a control application 240 may receive via the interface (e.g., interface 500*a*) a first input from a user 102 selecting the one or more actions to be applied to the data sets. Further, according to some embodiments, the control application 240 may receive via the interface (e.g., interface 500*a*) a second input from a user 102, indicating the user's desire to create a task to place in a processing pipeline based on the selected actions. For example, interface 500*a* as shown in FIG. 5A includes a "render transformations" button 560*a*. In response to receiving the second input (e.g., the user 102 pressing the "render transformations" button 560*a*) the control application 240 may create a task object based on the first and second inputs. For example, according to some embodiments, a given task may be rendered as a JavaScript Object Notation ("JSON") object or file that includes processing instructions that may be interpretable by a distributed computing cluster for processing (e.g., a cluster 126 employing a Hadoop Distributed File System). In this way a complex set of transformation instructions, interpretable by a distributed processing cluster, may be generated by a user 102, without the need for writing any code, using simple inputs via a graphical user interface (e.g., interface 500*a*).

At step 208, according to some embodiments, the control application 240 may place the task object in a queue for processing at a pipeline processor 122.

At step 210, according to some embodiments, a pipeline processor 122 may execute one or more actions (e.g., an ingest action) according to the actions specified in the task object. For example, the pipeline processor may at step 210 ingest data from the staging point (e.g., storage platform 106, according to some embodiments). The data may be ingested according to sets or subsets of data selected by user 102 at step 206 and specified in the created task object. In other words, according to some embodiments, only a subset of the entire aggregated set of raw data may be ingested into the processing pipeline at step 210. The ingested data may be referred to as the "task data" for the task associated with a particular task object.

Further, according to some embodiments, the ingested set or subset of data may be sampled (e.g., according to the sampling process previously described) and a representative sample of the larger data may be saved to the application database 124. This more manageable representative sample of the larger data set may be accessible to the user 102 via device 104. For example, recall table 502*a* displayed to user 102 via interface 500*a* of device 104 (as shown in FIG. 5*a*). The table, "GP Practice Demographics," in this example may represent a sampled set of the larger data set ingested from the staging area for processing via pipeline processor 122 at step 210. According to some embodiments the entire ingested data set may be accessible to the user 102 via device 104, it is understood that the size of such data sets may, in such embodiments, render management of the data unwieldy to a user 102.

At step 212, according to some embodiments, a pipeline processor 122 may invoke a distributed computing cluster 126 in order to efficiently process the task data according to the actions specified in the task object. As mentioned earlier, according to some embodiments, a cluster 126 may be a Hadoop™ cluster. In such an embodiment, the task object created by control application 240 (e.g., a JSON object) may be translated into a Hadoop job which may in turn comprise a set of MapReduce jobs to be performed in parallel across the various nodes of the cluster 126.

According to some embodiments, at step 212, the pipeline processor 122 may process both the larger task data set as well as a representative sampled version of the larger task data set stored on the application database 124. As explained earlier, this more manageable representative sample of the larger data set may be accessible to the user 102 via device 104. In this way, user 102 may view, in near real time, the processed state of the data through accessing the processed representative sample of the data. Consider again table 502*a* displayed to user 102 via interface 500*a* of device 104 (as shown in FIG. 5*a*). The table, "GP Practice Demographics," in this example may represent a sampled set of the larger data set ingested from the staging area for processing via pipeline processor 122. According to some embodiments, at step 212, the pipeline processor may process both the larger task data set as well as the representative sample data set in parallel. The representative sample data set, will of course be smaller than the larger task data set, therefore processing will likely take less time. For example, user 102 may define a transformation (e.g., transformation 540*a*) to apply to the larger data set as represented by the representative sample data displayed as table 502*a*. When the user 102 presses the render transformations button, a task object may be created which may cause pipeline processor 122 to process the larger task data set and the representative sample data set in parallel. In some cases, the larger task data set may be several gigabytes or even terabytes of data and so processing even simple tasks, such as a column split may take some time (note: user 102 may view the progress of such processing via interface 500b or 500c as shown in FIGS. 5B and 5C). However, processing of the representative data set (which, depending on sampling characteristics, may be no more than several megabytes large, may be performed near instantaneously from the point of view of the user 102. In other words, according to this example, form the perspective of user 102, column 514a may split into two columns in near real time in response to user 102 "rendering" transformation 540a. Accordingly, a user 102 may perform a series of transformations via interface 500a to the representative sample data set as if they were editing a locally saved spreadsheet file. Each transformation applied to the representative sample may then be queued for processing of the larger task data set by pipeline processor 122.

Upon completion of processing of the task data, at step 214, the pipeline processor may update a status of the task in the application database 124 for use by the control application in providing monitoring and auditing capabilities to a user 102 via a device 104. For example, stratus data in the application database may be accessed to inform status information as presented by interface 500c as shown in FIG. 5C.

Returning to FIG. 2, at step 216, a pipeline processor may export the processed task data for analysis. According to some embodiments, the processed task data may be exported as a Comma-Separated Values ("CSV") file and may be exported to a large-scale data analytics platform 140. As described with reference to FIG. 1, a large-scale data analytics platform 140 may be provided as service by a third-party, for example Google BigQuery™ or Amazon Redshift™. According to some embodiments, analysis may be performed at platform 120 without need of a third-party analytics platform. However, as previously described, the processed data may be stored by platform 120 for analysis without the use of a third-party analytics platform 140. For example, a person having skill will recognize that according to some embodiments, control application 240 (or other software part of platform 120) may be further configured to provide analysis of the processed data to user 102 via device 104.

Returning to FIG. 2, at step 218, according to some embodiments, a user 102 may via a device 104 analyze the processed data. According to some embodiments, user 102 may analyze the processed data via a large-scale data analytics platform using business intelligence and analytics software. For example, a user 102 may use visual analysis software such as Tableau™ in conjunction with Google BigQuery™ to quickly and efficiently analyze and visualize large-scale data sets. As mentioned earlier, a user 102 in this context may be a business analyst and not an information technology or information systems specialist and therefore analysis of the processed data may be performed through using simple visual analysis tools without the need to write any programming code.

Figure 3:
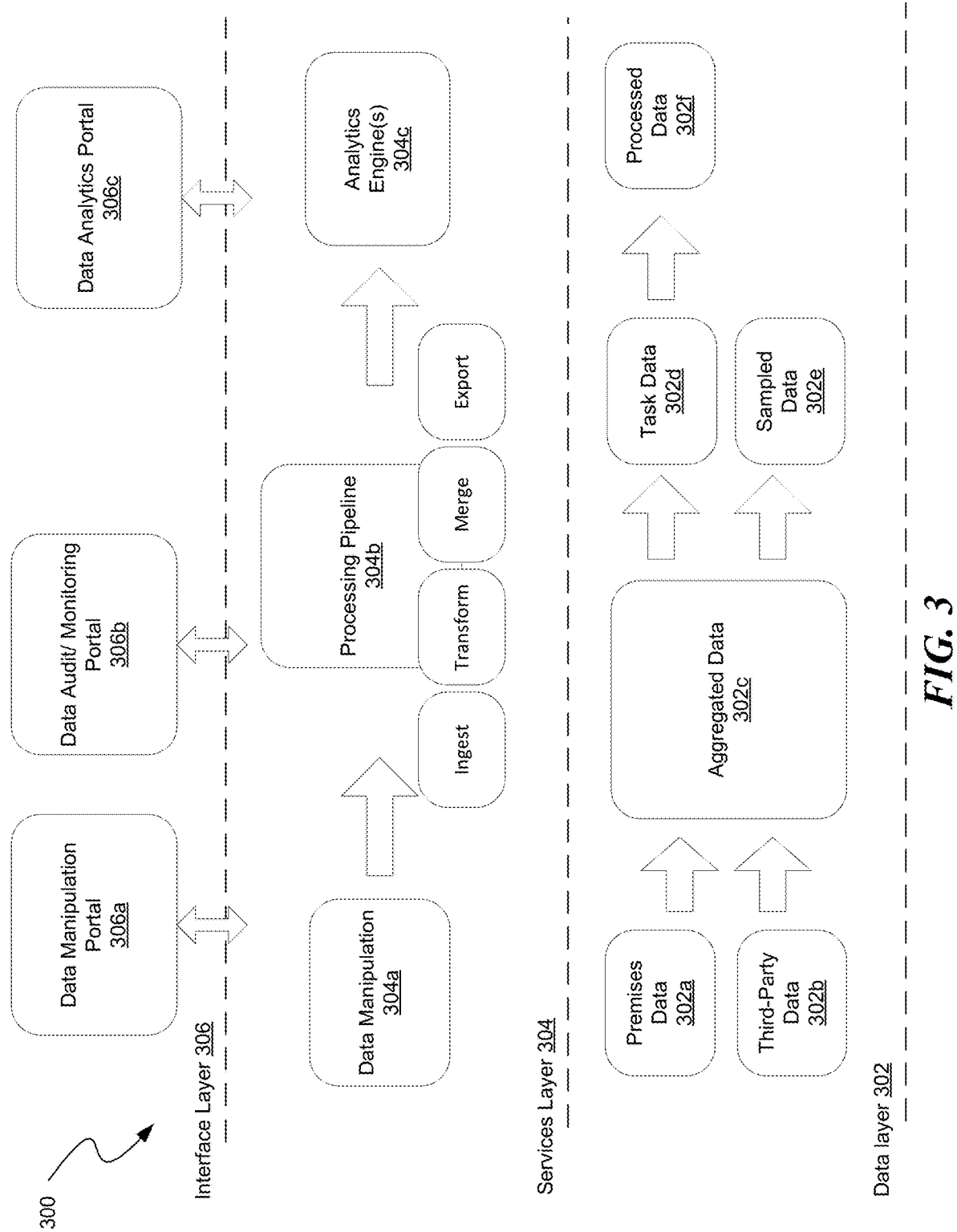
FIG. 3 is a high-level conceptual diagram of an example layered architecture for aggregating, distilling, and analyzing multiple large-scale data sets, according to some embodiments.

FIG. 3 is a high-level conceptual diagram illustrating an example layered architecture 300 for aggregating, distilling, and analyzing multiple large-scale data sets, according to some embodiments of the present teachings. Layered architecture 300, as illustrated in FIG. 3, may be thought of as an alternative conceptualization of architecture 200, as illustrated in FIG. 2.

According to some embodiments, architecture 300 may include a data layer 302, a services layer 304, and an interface layer 306. For example, data layer 302 may define the various stages of data as it is aggregated, distilled and analyzed. Services layer 304 may define the various services utilized to aggregate, distill and analyze the data at the data layer 302. Interface layer 306 may include one or more interfaces through which a user (e.g., user 102) may aggregate, distill and analyze the data of data layer 302 by accessing services at services layer 304.

According to some embodiments, data layer 302 may include disparate large-scale data sets 302a-302b, which may be aggregated into an aggregated raw data set 302c. Using the processes previously described, aggregated data 302c may be distilled into a task data 302d (and/or a representative sample data set 302e) for processing (e.g., by a processing pipeline 304b at the services layer 304). The result of the processing by the processing pipeline is the processed data 302f which may then be analyzed by one or more analytics engines 304c (e.g., as provided by large-scale data analytics platform 140 and/or associated business intelligence analytics software).

According to some embodiments, services layer 304 may include a data manipulation service 304a (e.g., as provided by control application 240 in FIG. 2) through which user 102 inputs provided via a data manipulation portal 306a (e.g., similar to interface 505a in FIG. 5A) may be converted to a task for processing by a processing pipeline service 304b (e.g., as provided by pipeline processor 122 in FIGS. 1-2). As shown in FIG. 3, a processing pipeline service 304b (e.g., as provided by pipeline processor 122 in FIGS. 1-2) may include one or more services to perform one or more actions on the data, including, but not limited to, ingestion, transformation, merging, and export. As shown in FIG. 3, one or more analytics engines 304c (e.g., as provided by large-scale data analytics platform 140 in FIGS. 1-2 and/or associated business intelligence analytics software) may be utilized to analyze processed data 302f via an analytics portal 306c (e.g., as provided by visual analytics software previously discussed).

According to some embodiments, interface layer 306 may include a data manipulation portal 306a (e.g., as provided by control application 240 and device 104 in FIG. 2 and as illustrated by interface 500a in FIG. 5A) through which a user 102 may easily manipulate data using data manipulation engine 304a. Further, as shown in FIG. 3, an interface layer 306 may include a data audit/monitoring portal 306b (e.g., as provided by control application 240 and device 104 in FIG. 2 and as illustrated by interface 500b and 500c in FIGS. 5B-5C) through which a user 102 may audit and monitor the status of the various data processing jobs in the processing pipeline 304b. Further, as shown in FIG. 3, an interface layer 306 may include a data analytics portal 306c (e.g., as provided by visual analytics software previously discussed) through which a user 102 may analyze the process data 302f via the one or more data analytics engines 304c (e.g., as provided by large-scale data analytics platform 140 in FIGS. 1-2 and/or associated business intelligence analytics software).

Figure 4A:
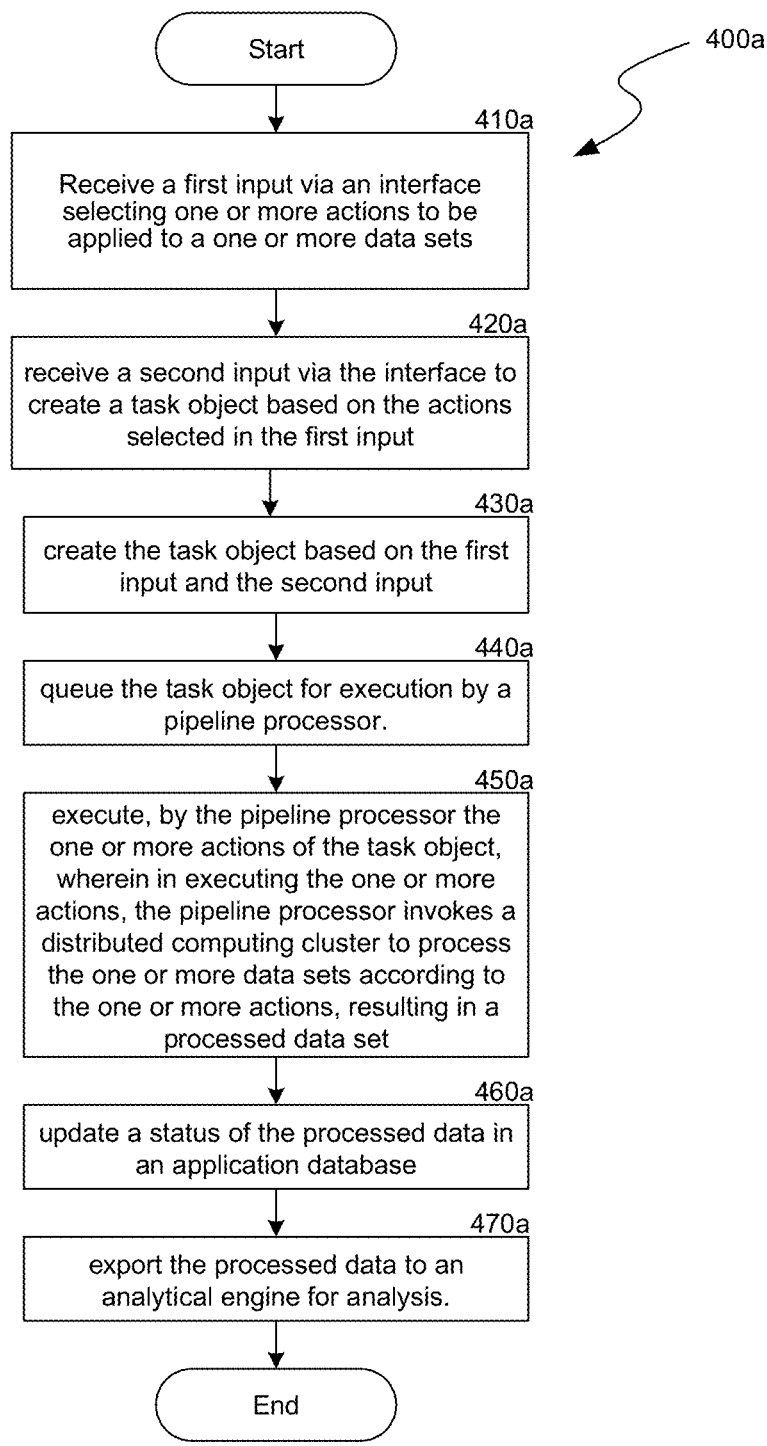
FIGS. 4A-4G are flow charts describing example methods for aggregating, distilling, and analyzing multiple large-scale data sets, according to some embodiments.

FIG. 4A is a flow chart describing an example method 400a for aggregating, distilling, and analyzing multiple large-scale data sets, according to some embodiments. The steps 410a-470a of method 400a are described in detail with reference to the description associated with FIGS. 2-3.

Figure 4B:
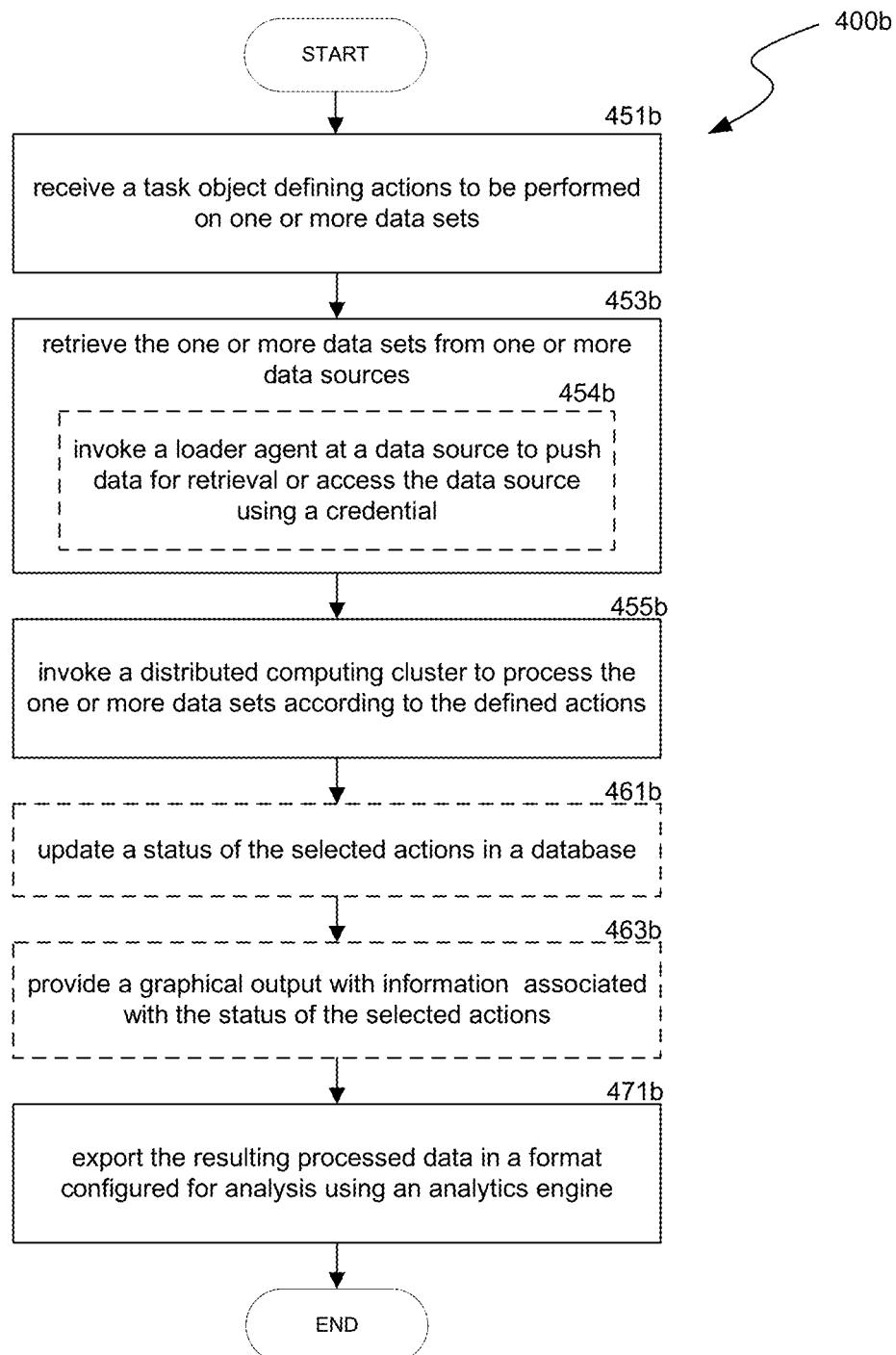

FIG. 4B is a flow chart describing an example method 400b for processing of one or more data sets by a pipeline processor (e.g., pipeline processor 122 of FIGS. 1-2) based on a received task object. As shown in FIG. 4B, method 400b begins at step 451b with receiving a task object defining action to be performed on one or more data sets. This step is described in more detail with reference to step 208 of the example process flow described with reference to FIG. 2. Next, at step 453*b*, the method continues with retrieving one or more data sets from one or more data sources. This step is described in more detail with reference to steps 202, 204, and 210 of the example process flow described with reference to FIG. 2. As described with reference to steps 202 and 204 in FIG. 2, step 453*b* may optionally include step 454*b* in which a loader agent at one or more of the data sources is invoked to push the data sets for retrieval or the one or more data sources are accessed using supplied credentials. The method continues at step 455*b* in which a distributed computing cluster is invoked to process the one or more selected data sets according to the one or more selected actions. This step is described in more detail with reference to step 212 of the example process flow described with reference to FIG. 2. The method optionally continues at step 461*b* in which the status of the selected one or more actions is updated in a database (e.g., application database 124 in FIG. 2) during or after processing. This step is described in more detail with reference to steps 210 and 214 of the example process flow described with reference to FIG. 2. The method optionally continues at step 463*b* in which a graphical output is provided with information associated with the status. An example graphical output is shown at interface 500*c* in FIG. 5C. Method 400*b* concludes at step 471*n* in which the resulting processed data is exported in a format configured for analysis using the analytics engine. This step is described in more detail with reference to step 216 of the example process flow described with reference to FIG. 2.

Figure 4C:
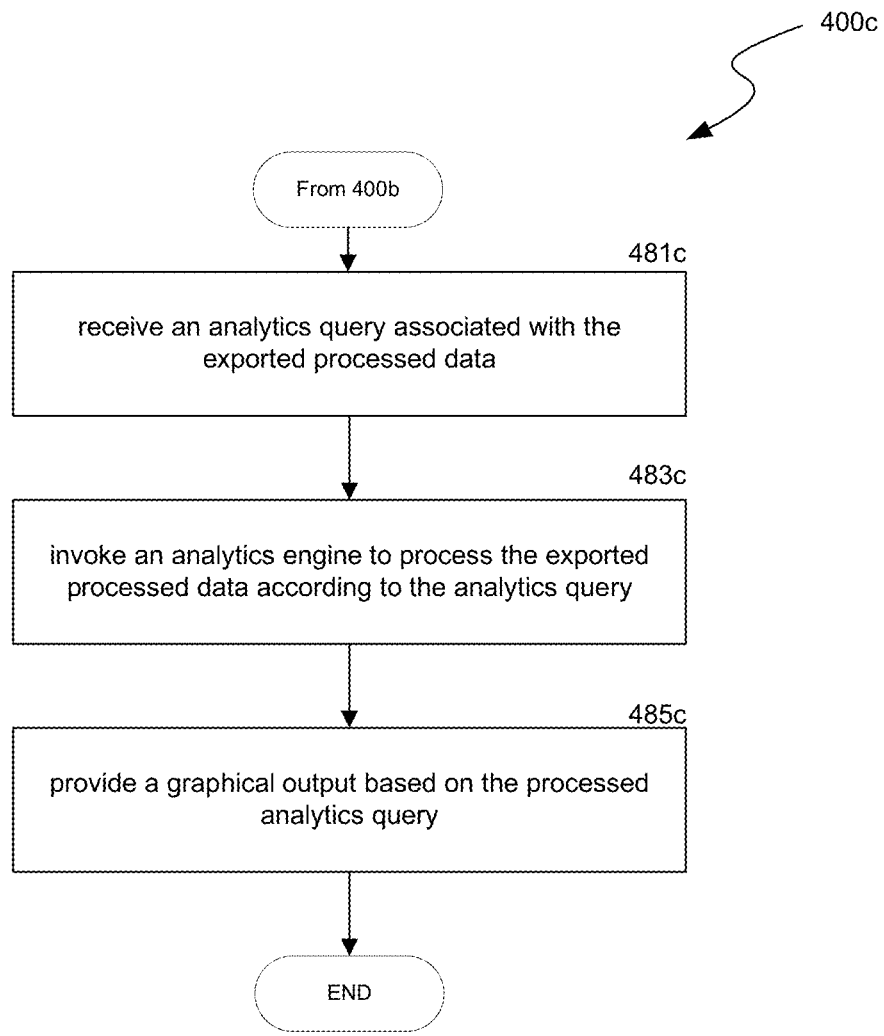

FIG. 4C is a flow chart describing an example method 400*b* for analyzing previously processed data, for example data processed according to the steps of method 400*b* shown in FIG. 4B. Method 400*c* begins at step 481*c* in which an analytics query associated with the exported previously processed data is received. For example, the query may be received at platform 120 and/or a third-party analytics platform 140 as shown in FIG. 2. The method continues at step 483*c* in which an analytics engine (e.g., at analytics platform 140) is invoked to process the exported data according to the analytics query. Finally, results of the processing in response to the analytics query are provided as an output (e.g., a graphical output) at step 485*c*.

Figure 4D:
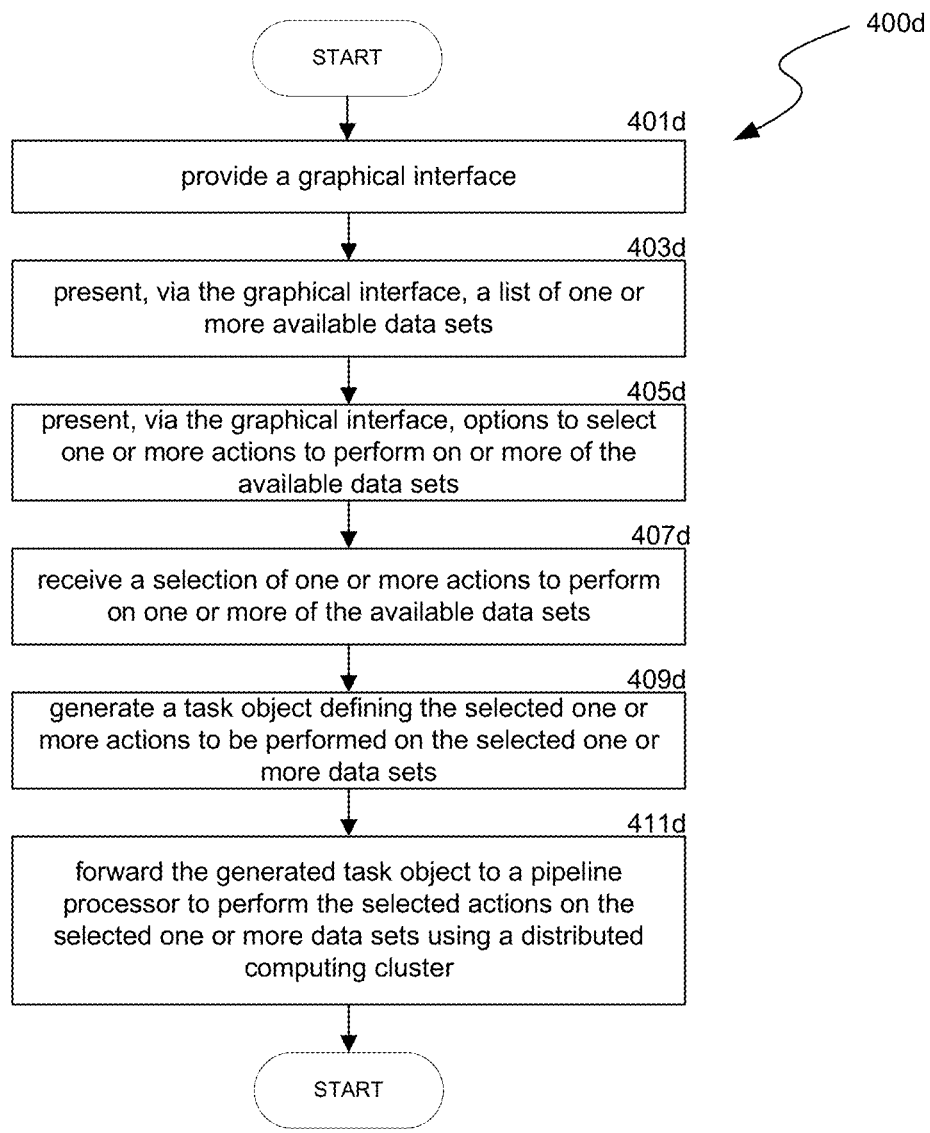

FIG. 4D is a flow chart describing an example method 400*d* for generating a task object based on inputs received via a graphical interface. The method begins at step 401*d* in which a graphical interface is provided (e.g., via a computing device 104 as shown in FIG. 2). An example interface 500*a* is shown in FIG. 5A. The method continues at steps 403*d* and 405*d* in which one or more data sets are presented (see e.g., table data 502*a* in FIG. 5A) and options to select one or more actions to perform on the one or more selected data sets are presented (e.g., at selections 540*a* and 542*a* in FIG. 5A). The method continues at step 407*d* in which selections of one or more actions to be performed on one or more data sets are received. This step is described in more detail with reference to step 206 of the example process flow described with reference to FIG. 2, and with reference to FIGS. 5A-5C. The method continues at step 409*d* in which a task object is generated based on the selected one or more actions to be performed on the selected one or more data sets. This step is described in more detail with reference to steps 206 and 208 of the example process flow described with reference to FIG. 2. Finally, the generated task object is forwarded to a pipeline processor for processing, for example, using a distributed computing cluster (e.g., cluster 126 shown in FIG. 2). This step is described in more detail with reference to steps 208 and 212 of the example process flow described with reference to FIG. 2.

Figure 4E:
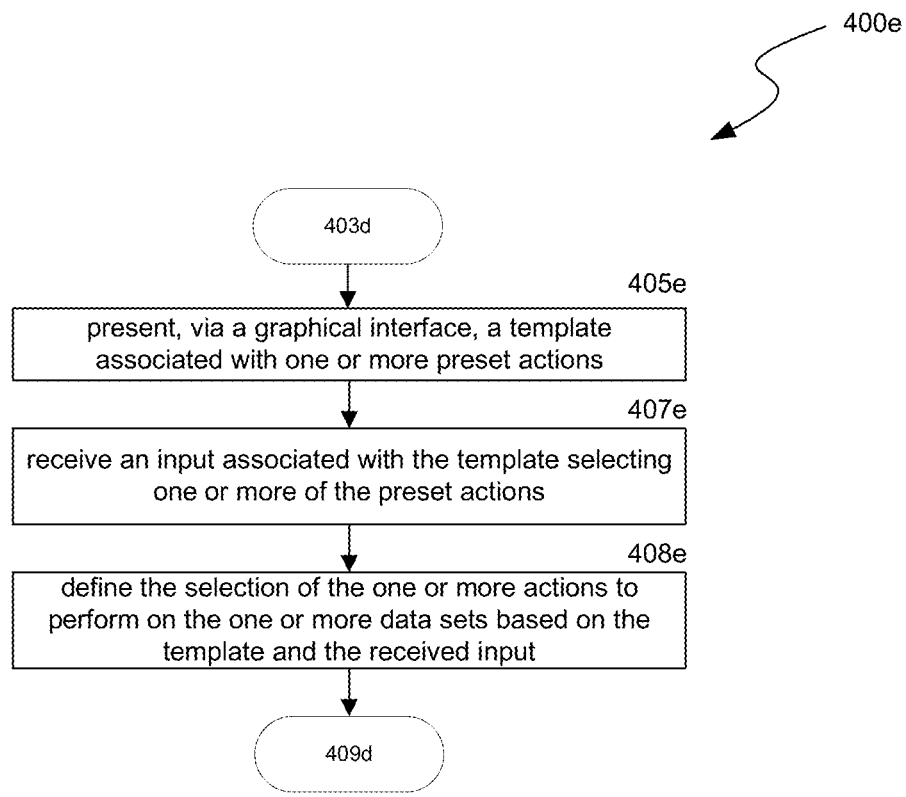

FIG. 4E is a flow chart describing an example method 400*e* by which a user may select the one or more actins associated with a task object. For example, method 400*e* may fall between steps 403*d* and 409*d* of method 400*d* described previously with reference to FIG. 4D. Method 400*e* begins at step 400*e* with presenting via a graphical interface a template associated with one or more preset actions. The process continues at step 407*e* with receiving an input associated with the template selecting one or more of the preset actions. Finally, at step 408*e*, the selection of the one or more preset actions is defined based on the template and the received input.

Figure 4F:
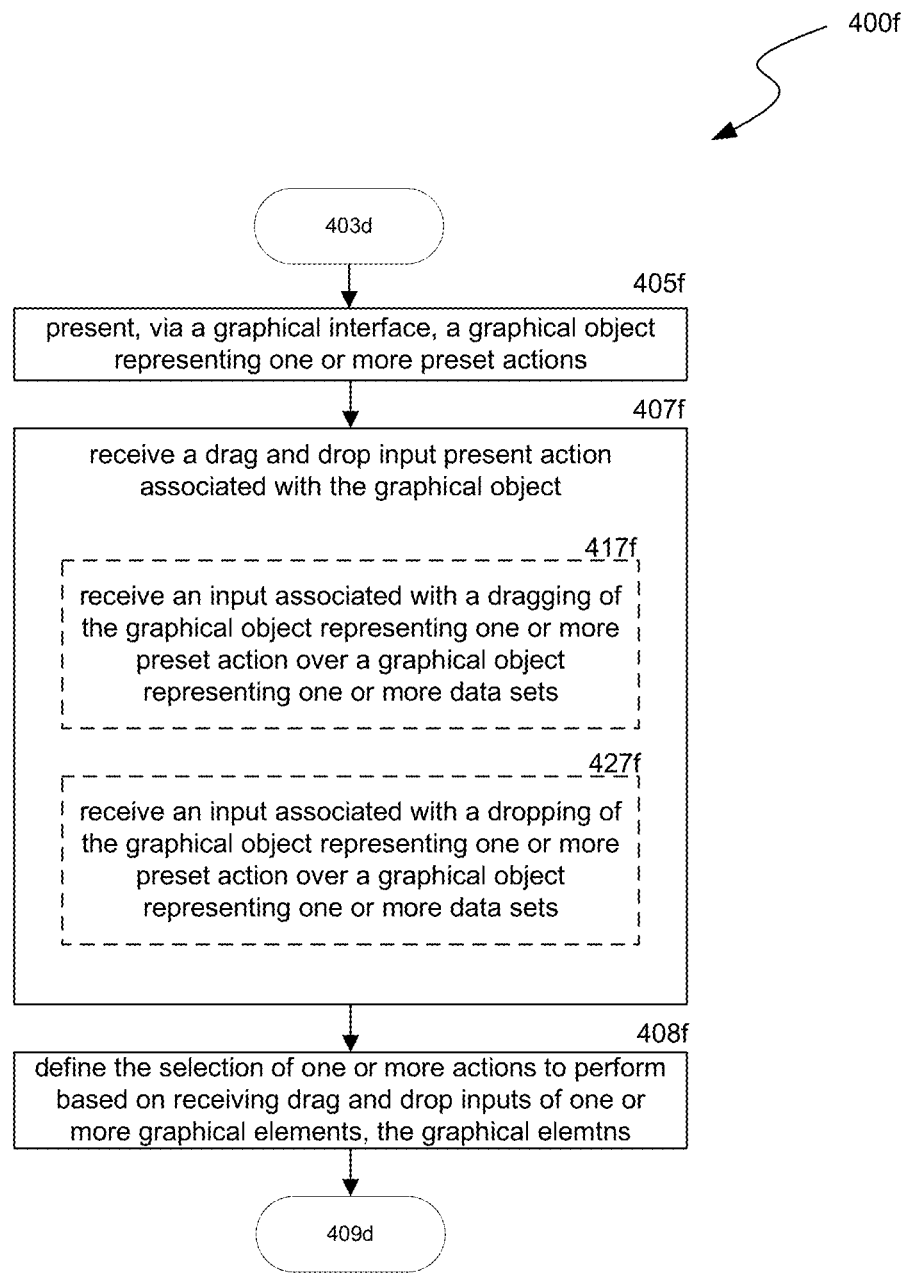

FIG. 4F is a flow chart describing a second example method 400*f* by which a user may select the one or more actins associated with a task object. Here, the method begins at step 405*f* with presenting via a graphical interface a graphical object representing one or more preset actions. The method continues at step 407*f* with receiving a drag and drop input associated with the graphical object. For example, this step may include sub steps 417*f* with receiving an input associated with a dragging of the graphical object representing one or more preset action over a graphical object representing one or more data sets and 427*f* with receiving an input associated with a dragging of the graphical object representing one or more preset action over a graphical object representing one or more data sets. Finally, at step 408*f*, the selection of the one or more preset actions is defined based on the drag and drop input. The steps of methods 400*e* and 400*f* are described in more detail with reference to step 206 in FIG. 2 and with reference to the example interfaces of FIGS. 5A-5C.

Figure 4G:
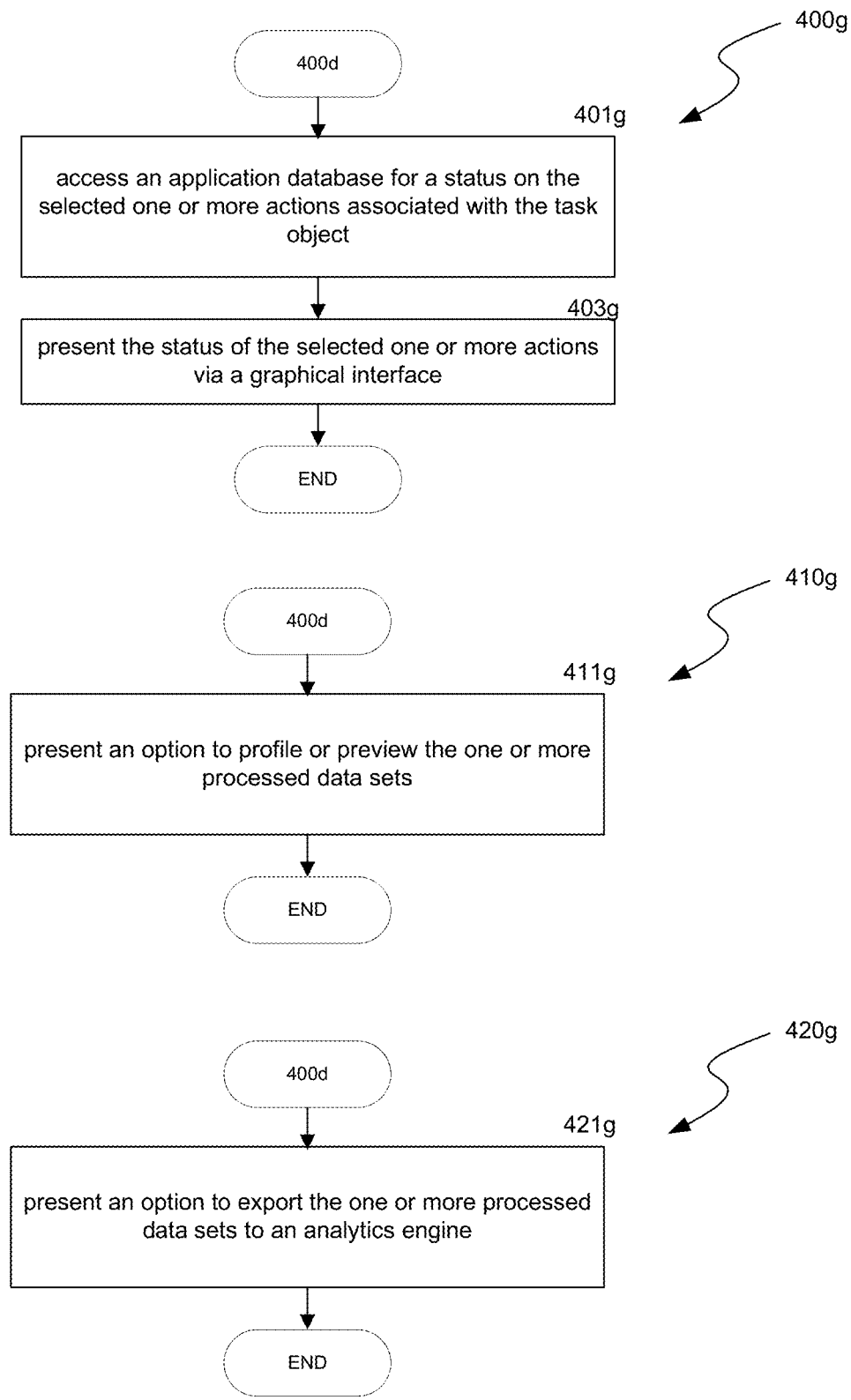

FIG. 4G includes example methods 400*g*-420*g* that optionally expand off of method 400*d* from FIG. 4D.

Method 400*g* continues from method 400*d* and describes a process of accessing an application database (e.g., database 124 shown in FIG. 2) for a status on the selected one or more actions associated with the task object (step 401*g*) and presenting the status of the selected one or more actions via a graphical interface (step 403*g*). These steps are described in more detail with reference to the application database 124 shown in FIG. 2 and to the example interfaces shown in FIGS. 5A-5C.

Method 410*g* continues from method 400*d* and describes a process of presenting an option to profile or preview one or more processed data sets. This is illustrated in example form with reference to FIGS. 5A-5C.

Method 420*g* continues from method 400*d* and describes a process of presenting an option to export the one or more processed data sets to an analytics engine. This is illustrated in example form with reference to FIGS. 5A-5C.

Graphical Interface

FIGS. 5A-5C illustrate a series of example interfaces 500*a*-500*c* through which a user 102 may access the functionalities of a system according to the present teachings via a device 104. The interfaces 500*a*-500*c* are described in detail with reference to the description associated with FIG. 2.

User interaction with the example interfaces 500*a*-500*c* is described in more detail in the previous section in relation to the process flows described with reference to FIGS. 1-2.

In some embodiments interfaces 500*a*-500*c* may be provided as a web interface via a web browser application instantiated at a user device 104. In some embodiments interfaces 500a-500c may be provided by a control application (e.g., application 240 shown in FIG. 2) instantiated at a user device 104.

Background Information—Computer System

Figure 6:
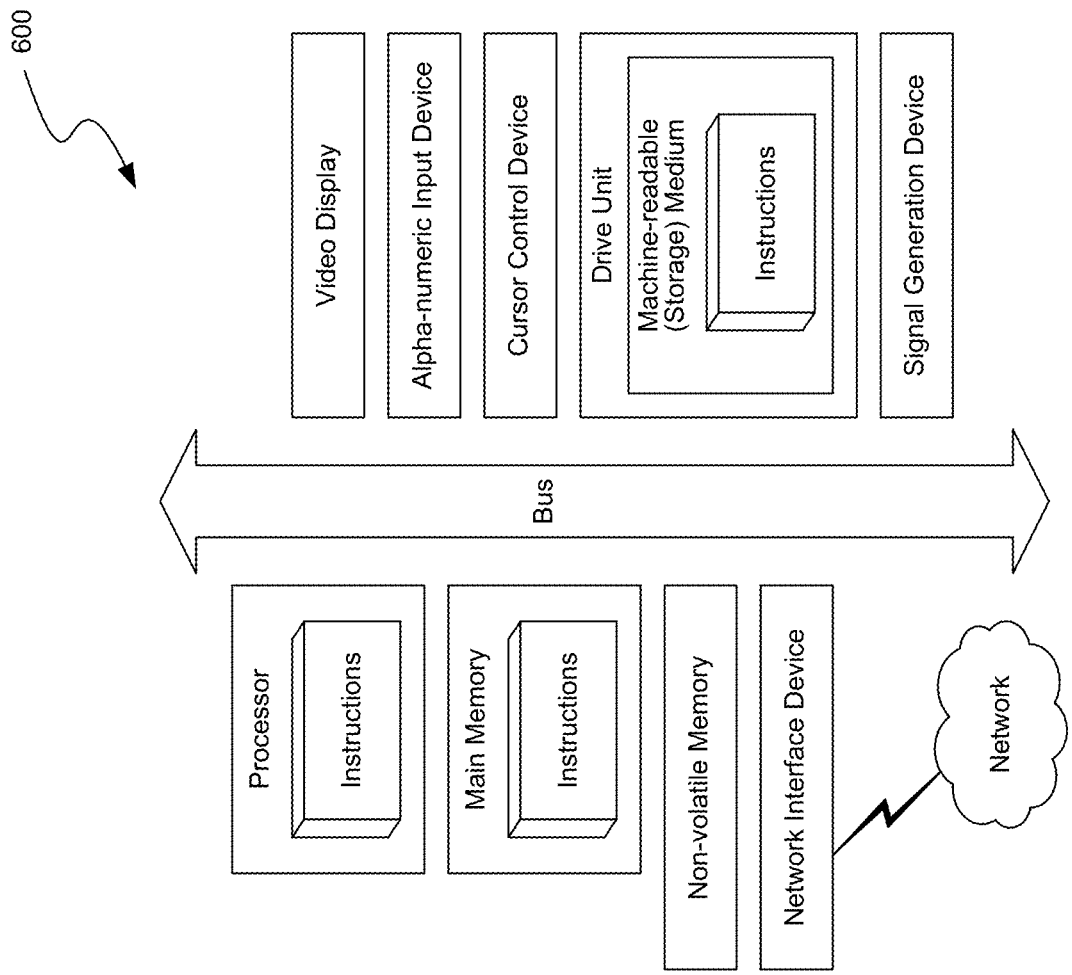
FIG. 6 is a diagram illustrating a machine in the example form of a computer system within which a set of instructions, for causing the machine to perform any one or more of the methodologies discussed herein, can be executed

FIG. 6 is a diagram illustrating a machine 600 in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine may be a server computer, a client computer, a personal computer (PC), a user device, a tablet, a phablet, a laptop computer, a set-top box (STB), a personal digital assistant (PDA), a thin-client device, a cellular telephone, an iPhone™, an iPad™, a Blackberry™, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed repository, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 600 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Disclaimers

The description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Additional Remarks

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes some embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing some features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While some aspects of the disclosure may be presented herein in some claim forms, the inventors contemplate the various aspects of the disclosure in any number of claim forms. For example, while only one aspect of the disclosure is recited as a means-plus-function claim under 35 U.S.C. § 112(f), other aspects can likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

What is claimed is:

1. A computer-implemented method for preparing data for analysis, the method comprising the steps of:
   receiving a task object defining one or more actions to be performed on one or more data sets;
   retrieving the one or more data sets from one or more data sources;
   causing a distributed computing cluster to:
      process the one or more data sets according to the one or more actions; and
      generate, in parallel, a task data set and a sample data set based on the processing, the sample data set comprising a representative sample of the task data set;
   causing display of at least a portion of the sample data set before the distributed computing cluster has completed generating the task data set; and
   exporting the task data set to an external analytics engine for analysis.

2. The computer-implemented method of claim 1, further comprising:
   updating a status of the one or more actions in a database; and
   causing display of an indication of the status of the one or more actions.

3. The computer-implemented method of claim 1, wherein the distributed computing cluster includes a Hadoop Distributed File System (HDFS).

4. The computer-implemented method of claim 1, wherein the task object is a JavaScript Object Notation (JSON) file defining a set of MapReduce jobs to be performed by the distributed computing cluster to process the one or more data sets according to the one or more actions.

5. The computer-implemented method of claim 1, wherein the task data set is export as a comma-separated values (CSV) file.

6. The computer-implemented method of claim 1, wherein the task object is received from a queue of a plurality of tasks awaiting processing.

7. The computer-implemented method of claim 1, wherein the task object is based on a selection by a user of the one or more data sets and the one or more actions to be performed on the one or more data sets.

8. The computer-implemented method of claim 1, further comprising:
   causing display of an interactive data transformation template, the interactive data transformation template including one or more preset data transformation actions;
   detecting user interaction with the interactive data transformation template, the detected user interaction including:
      a first selection of the one or more data sets from a plurality of available data sets; and
      a second selection of one or more points in the one or more data sets at which to apply the one or more preset data transformation actions of the interactive data transformation template; and
   generating the task object based on the detected user interaction with the interactive data transformation template.

9. The computer-implemented method of claim 1, wherein the one or more data sources include one or more of, a premises data source associated with an organization, a cloud-based third-party data source, and a cloud-based data storage platform;
   wherein, the cloud-based data storage platform is a staging area for data from either of the premises data source or the third-party data source.

10. The computer-implemented method of claim 1, wherein retrieving the one or more data sets from the one or more data sources includes invoking a loader agent at the one or more data sources to push the data for retrieval or accessing the one or more data sources using one or more credentials to pull the data.

11. The computer-implemented method of claim 1, wherein the one or more actions include filtering, sampling, profiling, normalizing, modifying, interpolating, inserting, merging, concatenating, and appending.

12. The computer implemented method of claim 1, further comprising:
   receiving an analytics query;
   causing the external analytics engine to process the task data set based on the analytics query; and
   causing display of a graphical output based on the processing of the task data set.

13. The computer implemented method of claim 1, wherein the external analytics engine is provided by a third-party analytics platform.

14. A system for preparing data for analysis, the system comprising:
   one or more processors;
   one or more memory units having instructions stored thereon, which when executed by the one or more processors, cause the system to:
      receive a task object defining one or more actions to be performed on one or more data sets;
      retrieve the one or more data sets from one or more data sources;
      cause a distributed computing cluster to:
         process the one or more data sets according to the one or more actions; and
         generate, in parallel, a task data set and a sample data set based on the processing, the sample data set comprising a representative sample of the task data set;
      cause display of at least a portion of the sample data set before the distributed computing cluster has completed generating the task data set; and
      export the task data set to an external analytics engine for analysis.

15. The system of claim 14, wherein the one or more memory units have further instructions stored thereon, which when executed by the one or more processors, cause the system to further:
   update a status of the one or more selected actions in a database; and
   cause display of an indication of the status of the one or more selected actions.

16. The system of claim 14, wherein the distributed computing cluster includes a Hadoop Distributed File System (HDFS).

17. The system of claim 14, wherein the task object is a JavaScript Object Notation (JSON) file defining a set of MapReduce jobs to be performed by the distributed computing cluster to process the one or more data sets according to the selected one or more actions.

18. The system of claim 14, wherein the task data set is export as a comma-separated values (CSV) file.

19. The system of claim 14, wherein the task object is received from a queue of a plurality of tasks awaiting processing.

20. A non-transitory computer-readable medium having instructions stored thereon, which when executed by a computer system, cause the computer system to:
- receive a task object defining one or more actions to be performed on one or more data sets;
- retrieve the one or more data sets from one or more data sources;
- cause a distributed computing cluster to:
  - process the one or more data sets according to the one or more actions; and
  - generate, in parallel, a task data set and a sample data set based on the processing, the sample data set comprising a representative sample of the task data set;
- cause display of at least a portion of the sample data set before the distributed computing cluster has completed generating the task data set; and
- export the task data set to an external analytics engine for analysis.

* * * * *